US006681790B2

(12) United States Patent
Knobbe et al.

(10) Patent No.: US 6,681,790 B2
(45) Date of Patent: Jan. 27, 2004

(54) PORTED SLIDE GATE VALVE WITH GATE MOTION TO BREAK SCALE BUILD UP

(75) Inventors: Bruce P. Knobbe, Tomball, TX (US); Douglas S. Gray, Lancaster, PA (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 112 days.

(21) Appl. No.: 10/156,529

(22) Filed: May 28, 2002

(65) Prior Publication Data

US 2003/0062502 A1 Apr. 3, 2003

Related U.S. Application Data

(60) Provisional application No. 60/326,856, filed on Oct. 3, 2001.

(51) Int. Cl.[7] ................................................. F16K 3/00
(52) U.S. Cl. ..................................... 137/15.01; 251/326
(58) Field of Search ................................ 251/326, 327, 251/328, 329; 137/15.01, 15.07

(56) References Cited

U.S. PATENT DOCUMENTS

| | | | | | |
|---|---|---|---|---|---|
| 3,256,897 A | * | 6/1966 | Carlton | ........................ | 251/327 |
| 3,749,114 A | * | 7/1973 | Johnstone et al. | .......... | 251/329 |
| 4,070,161 A | * | 1/1978 | Harter | ........................ | 251/326 |
| 4,253,483 A | * | 3/1981 | Cornelius | .................... | 251/329 |
| 4,938,250 A | * | 7/1990 | Peterson | ..................... | 251/329 |
| 6,325,358 B1 | * | 12/2001 | Bower | ..................... | 137/15.01 |

* cited by examiner

Primary Examiner—John Bastianelli (57) ABSTRACT

A ported slide gate valve having a gate for regulating the flow of a fluid through the valve, a seat located in the valve interior, and a means for causing the gate to move in such a manner that the gate fractures any scale built up in the lower portion of the valve interior, prior to the gate's movement to a valve closed position. The scale is fractured in a direction away from the seat and deposited in the fluid. More particularly, the means for causing the gate to move includes a primary piston and a secondary piston, where the primary piston is coupled to the gate. In the valve closed position, the secondary piston holds the primary piston in the desired position. A movement of the secondary piston causes the gate to move to fracture the scale in the lower portion of the valve interior.

9 Claims, 8 Drawing Sheets

PORTED SLIDE GATE VALVE WITH GATE MOTION TO BREAK SCALE BUILD UP

PRIORITY FILING

This application claims the benefit of the earlier filing date, under 35 U.S.C. 119, of commonly owned provisional patent application, Ser. No. 60/326,856 entitled "Slurry Valve With Operator Action to Break Pipeline Scale," filed on Oct. 3, 2001.

FIELD OF THE INVENTION

The present invention relates to valves in general and more particularly, to a ported gate valve for use in slurry service.

BACKGROUND OF THE INVENTION

Ported slide gate valves are usually used in slurry service because these valves provide good wear resistance to abrasive slurries. Ported slide gate valves with rubber or elastomeric seats that allow tight shut-off provide the most efficient type of valve performance in these harsh environments. The rubber or elastomeric seats also serve as wear resistant liners for the valve interiors. Such a valve conventionally utilizes a gate with an aperture and an operator that opens or closes the gate in one motion.

Some slurry systems generate a hard scale in the pipelines and valve interior surfaces. In those environments, operators are typically configured with larger than normal operating forces so that the opening or closing of the gate breaks the hard scale build up.

However, when such a valve closes, the gate typically drags the scale fragments into the seats, thereby tearing them. This tearing destroys the valve seats and consequently, results in premature valve failure.

Prior art systems occasionally used metal seats for such valves, in order to avoid seat damage. However, metal seated valves do not provide as tight of a shut-off as rubber or elastomeric seated valves.

Therefore, a need exists for a ported slide gate valve which overcomes the problem of scale build up and also enables the utilization of rubber or elastomeric seats with such a valve. Eliminating those problems would improve overall valve performance, prolong valve life and reduce maintenance and downtime costs.

SUMMARY OF THE INVENTION

The present invention relates to a ported slide gate valve where the gate has an open position, in which a portion of the gate having an aperture is aligned between ported elements to allow the passage of fluid through the valve, and a closed position, in which a solid portion of the gate is aligned between the ported elements. A means is coupled to the gate so that, prior to the movement of the gate to the closed position, the gate first has a reverse movement in a direction counter to the closing direction. This reverse movement breaks any scale buildup on a seat or seats, located in the valve interior, in such a manner that the scale is broken in a direction away from the seat or seats and deposited in the fluid.

Another aspect of the invention includes having a primary piston and a secondary piston as part of the means for moving the gate, where the primary piston is coupled to the gate in order to cause the movement of the gate. In the valve open position, the secondary piston holds the primary piston in the desired position. A movement of the secondary piston causes the reverse movement to break the scale.

DETAILED DESCRIPTION OF THE INVENTION

Figure 1:
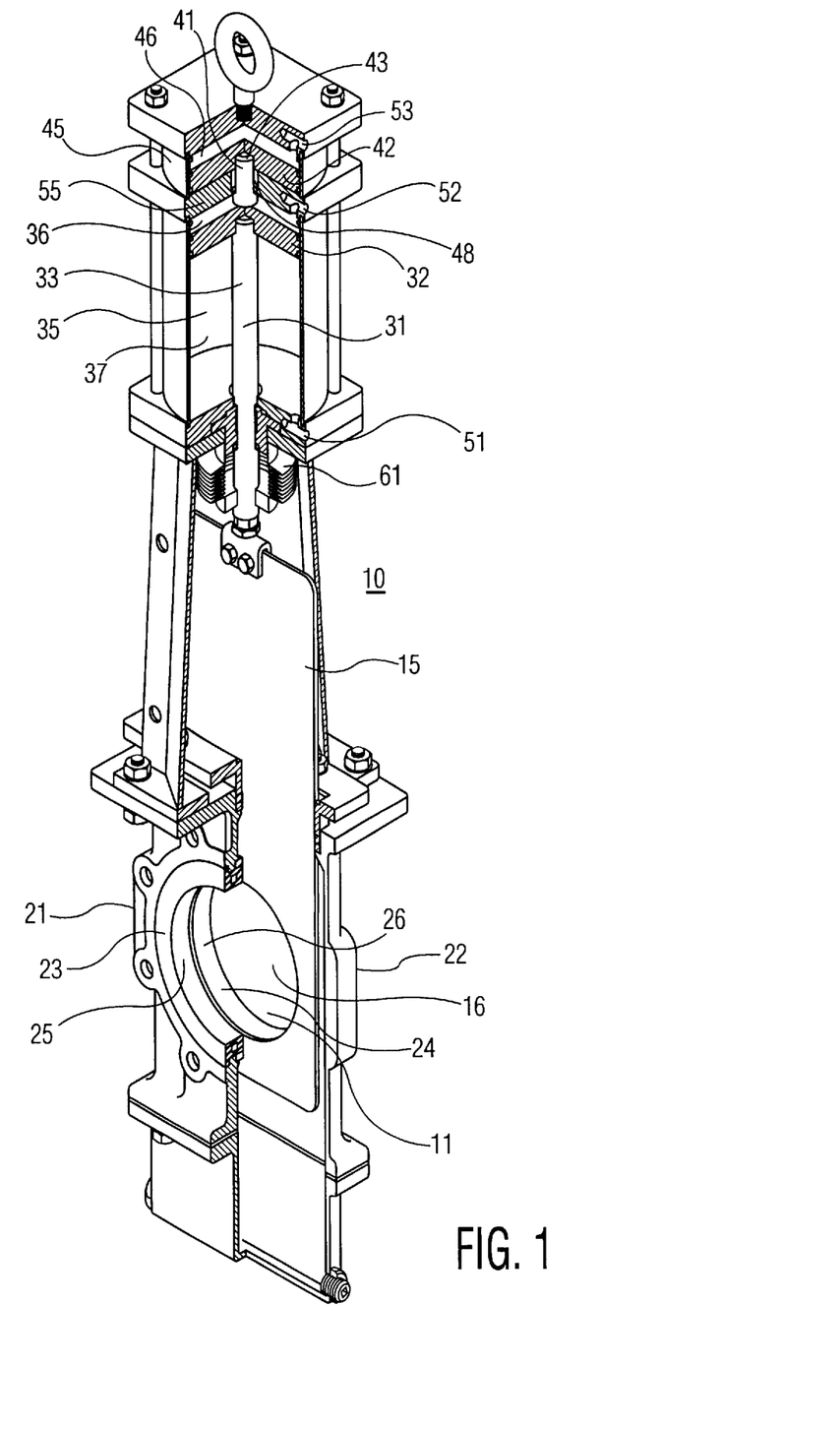
FIG. 1 is a perspective view of a valve according to the invention in an open position, partially in cross-section to show operation.

FIG. 1, shows a typical ported slide gate valve 10. The valve 10 is shown in an open position. The valve 10 has a gate 15, which is a planar member having an aperture 16 located in its surface. On each side of the valve are ported pipe-coupling elements 21 and 22. Each pipe-coupling element has a seat located therein. The seats are typically made of a rubber or elastomeric material, as described above. They are designated on one side by the numeral 23. On the other side, it is shown, along with the associated pipe-coupling element 22, in cross section and designated by the numeral 24.

The gate 15 is connected to a piston rod 31, which in operation moves the gate upwards and downwards. The piston rod is surrounded by a bellows 61, which is typically constructed of a Hyperlon or nylon material and is used to prevent external contamination from damaging the piston rod 31.

The piston rod is secured to a piston head 32. This piston rod and associated head comprise a primary piston 33. Located near the primary piston 33 is a secondary piston 43, comprising another piston rod 41 and head 42. The primary piston head 32 is configured to move within a first cylinder 35. The secondary piston head 42 is configured to move within a second cylinder 45, and its associated rod 41 is movably placed within an aperture 48 in an intermediate member 55.

Also shown in FIG. 1 are hydraulic or control ports 51, 52 and 53. These ports are conventionally coupled to a source of hydraulics or air and serve to operate the respective pistons in a well-known manner. Essentially, hydraulic fluid or air enters through the ports into the associated cylinders, thereby forcing the pistons to move to upper or lower positions. Port 53 communicates with the space 46 above the secondary piston head 42. Port 52 communicates with the space 36 above the primary piston head 32, while port 51 communicates with the space 37 below the primary piston head 32.

FIG. 1 depicts the gate 15 in an open position. The gate aperture 16 is aligned with ports 25 and 26 in the two pipe-coupling elements 21 and 22, such that the interior circumference of the aperture 16 aligns with the interior circumference of the rubber or elastomeric seats 23 and 24, creating a valve bore 11. In this open position, a fluid such as slurry can flow through the valve bore 11.

Presumably, in this open position allowing fluid flow, scale builds up on the seats, which are part of the valve interior. Scale is a solid, rock-like deposit which, when broken, creates sharp fragments that may cut or fracture the rubber or elastomeric seats, thereby destroying them.

In the open position shown in FIG. 1, the secondary piston 43 has been lowered until its downward movement is stopped by its head 42 contacting the intermediate member 55. The primary piston 33, on the other hand, has been raised until its head 32 is stopped by contact with the secondary piston rod 41. The bellows 61 is contracted. Essentially, the secondary piston 43 stops the movement of the primary piston 33 and the two pistons hold the gate 15 in the open position. The cylinder operator of the present invention includes this cooperative operation of the two pistons, which will be elaborated upon further below.

Figure 2:
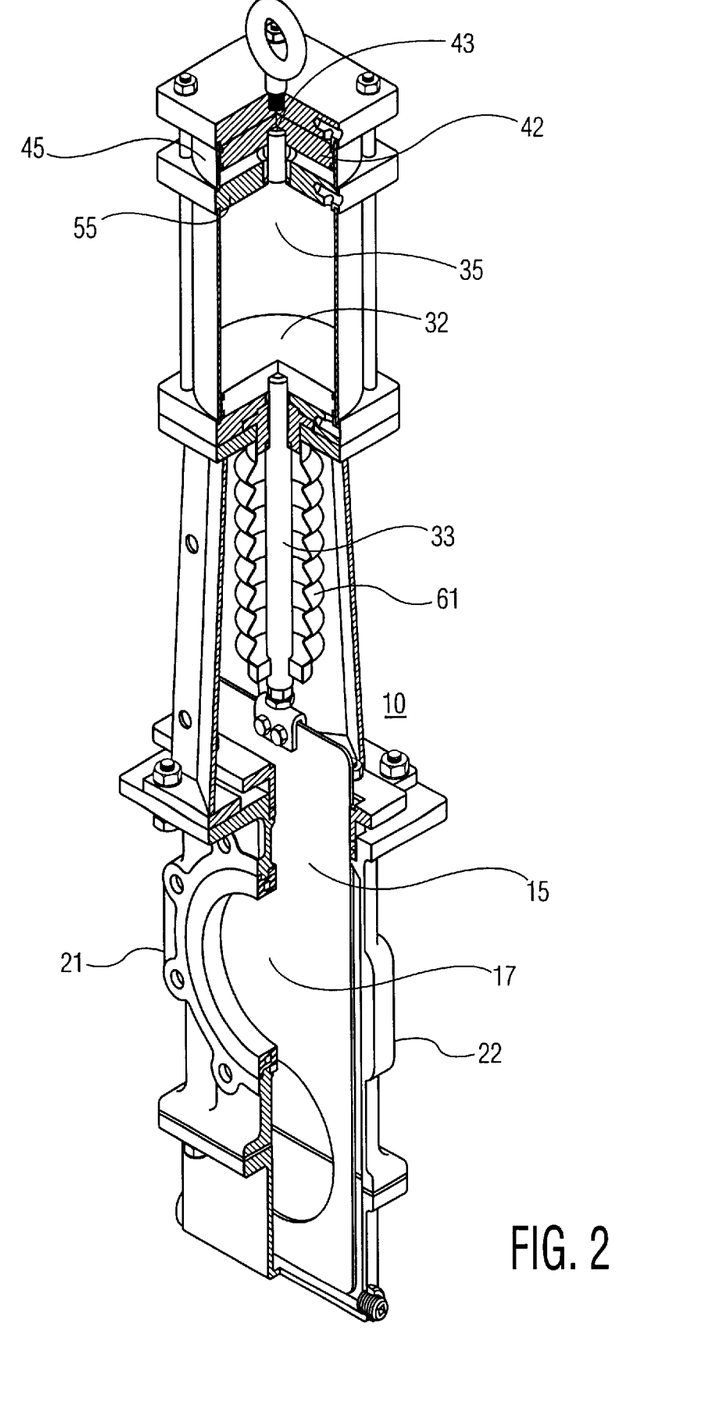
FIG. 2 depicts the valve of FIG. 1 in a closed position, according to the invention.

FIG. 2 illustrates the ported slide gate valve 10 in the closed position. The head 32 of the primary piston has now moved until it contacts the bottom of its cylinder 35. The bellows 61 is now extended. This movement of the primary piston 33 moves the gate 15 so that a solid planar portion 17 of the gate is positioned between the two pipe-coupling elements 21 and 22, thereby obstructing any fluid flow through the valve 10.

As shown in FIG. 2, the secondary piston 43 is now slightly moved upwards. Its head 42 is moved upwards in its cylinder 45 and no longer contacts the intermediate member 55.

Figure 3:
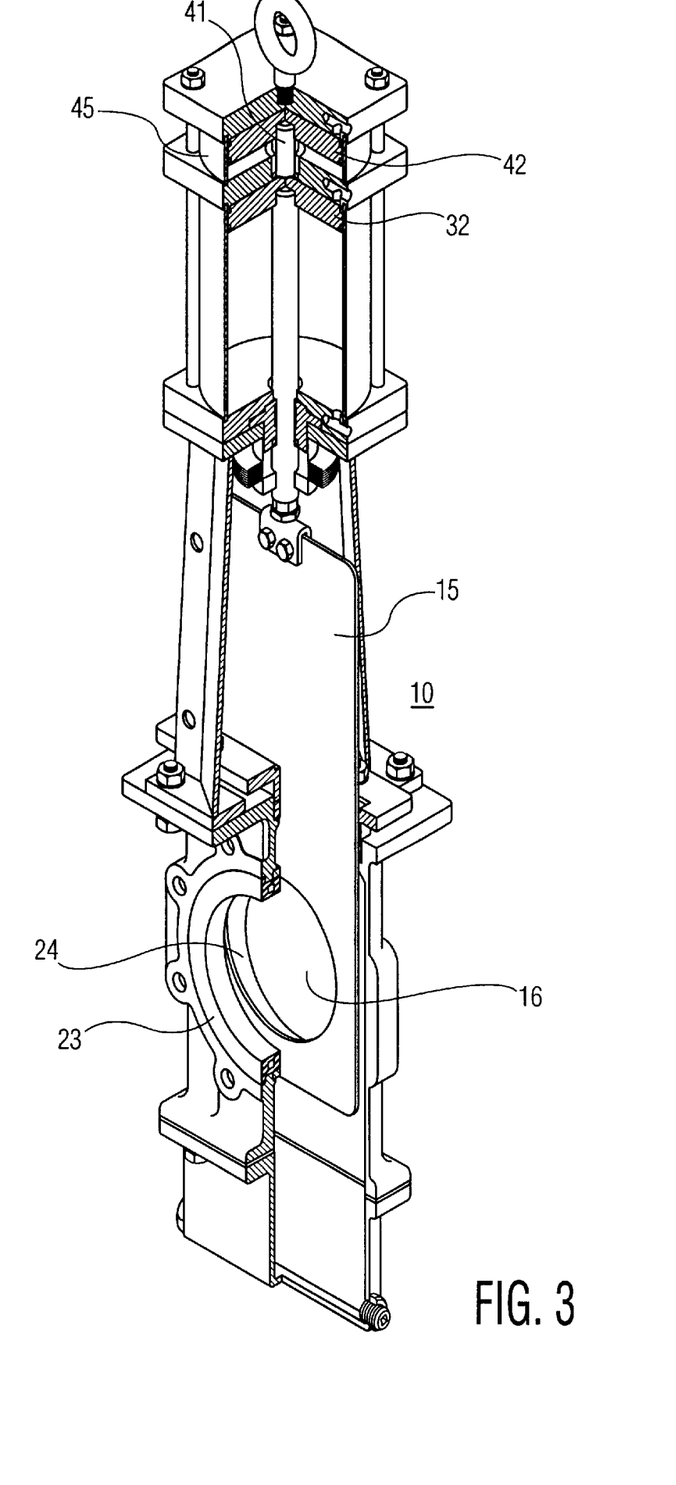
FIG. 3 depicts the valve in an intermediate position, according to the operation of the invention.

FIG. 3 shows the present invention in a position that would typically occur between the positions shown in FIG. 1 and FIG. 2. In this intermediate position, the secondary piston head 42 has moved upwards so that it contacts the top its cylinder 45. Meanwhile, the primary piston head 32 has moved upwards so that it contacts the bottom of the secondary piston rod 41.

Those piston movements cause the gate 15 to move slightly upwards, such that the periphery of the aperture 16 extends beyond the interior circumference of the seats 23 and 24, as illustrated in FIG. 3. Thus, the bottom periphery of the aperture 16 moves upwards from between the seats 23 and 24, thereby fracturing any scale built up in the bottom portion of the seats.

Figure 4:
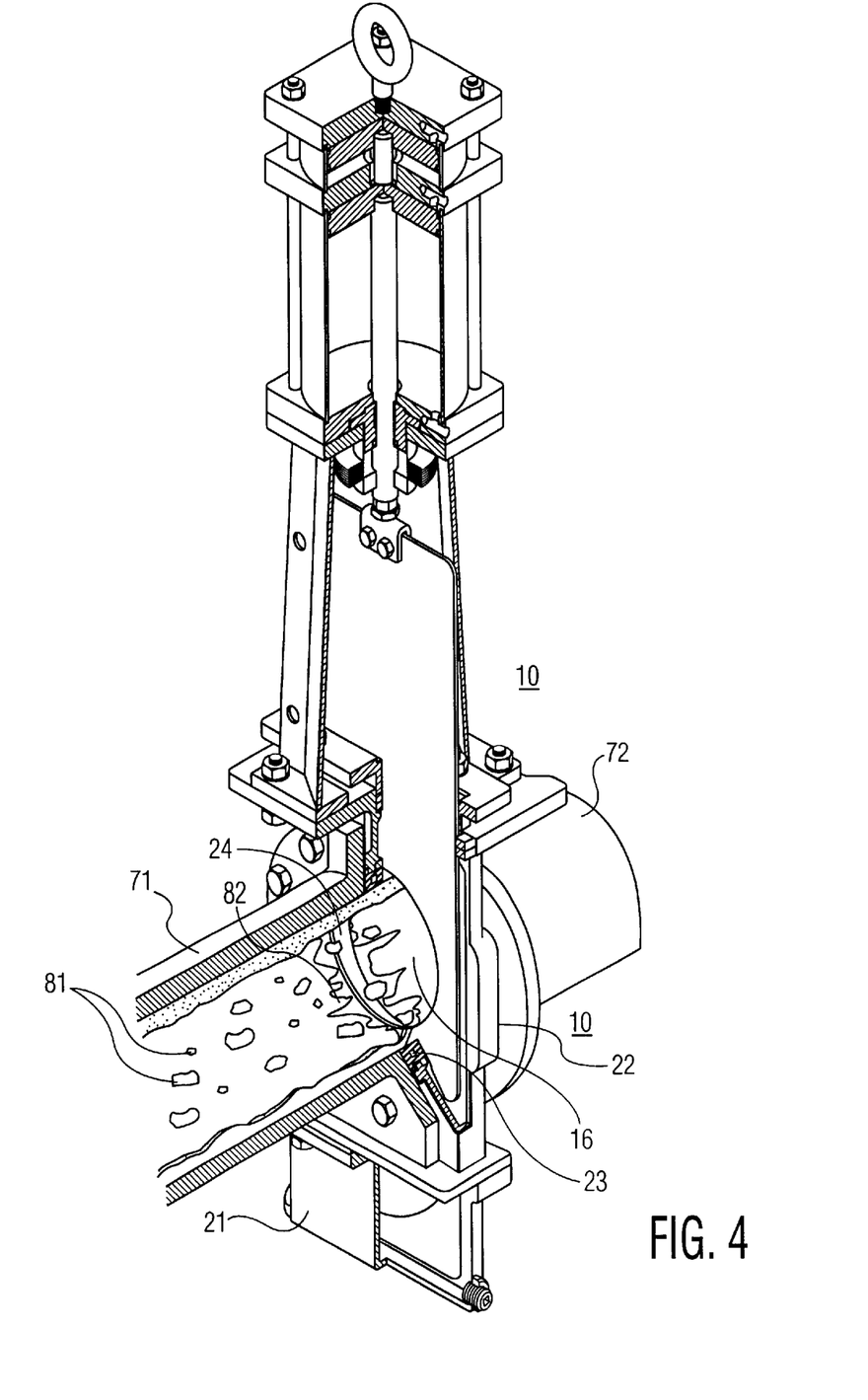
FIG. 4 shows the valve in an open position depicting the scale build up and the operation shown in FIG. 3, where the gate operates upwardly to break the scale build up prior to being fully closed.

FIG. 4 further illustrates this novel scale fracturing feature of the present invention. FIG. 4 shows the valve 10 in the same intermediate position as shown in FIG. 3. In FIG. 4, pipelines 71 and 72 are now shown connected to each of the pipe-coupling elements 21 and 22, creating a passageway for fluid flow, which can be regulated by the opening or closing of the valve 10.

In the intermediate position detailed in FIG. 4, the bottom portion of the gate aperture 16 is in the slightly raised position, and the drawing shows the fractured scale fragments 81 from the build up of scale 82 in the bottom portion of the seats 23 and 24. The slight upward movement of the gate aperture 16 breaks the scale build up 82 in such a manner that the scale fragments 81 are propelled into the fluid flow and transported away from the seats 23 and 24 by the fluid.

Thus, the present invention involves a slight reverse-direction movement of the gate 15, prior to moving downwards to a closed position. This movement fractures the scale build up 82 in the bottom portion of the seat area and deposits the scale fragments 81 in the fluid flow so that they can be carried away from the seat area.

Figure 5:
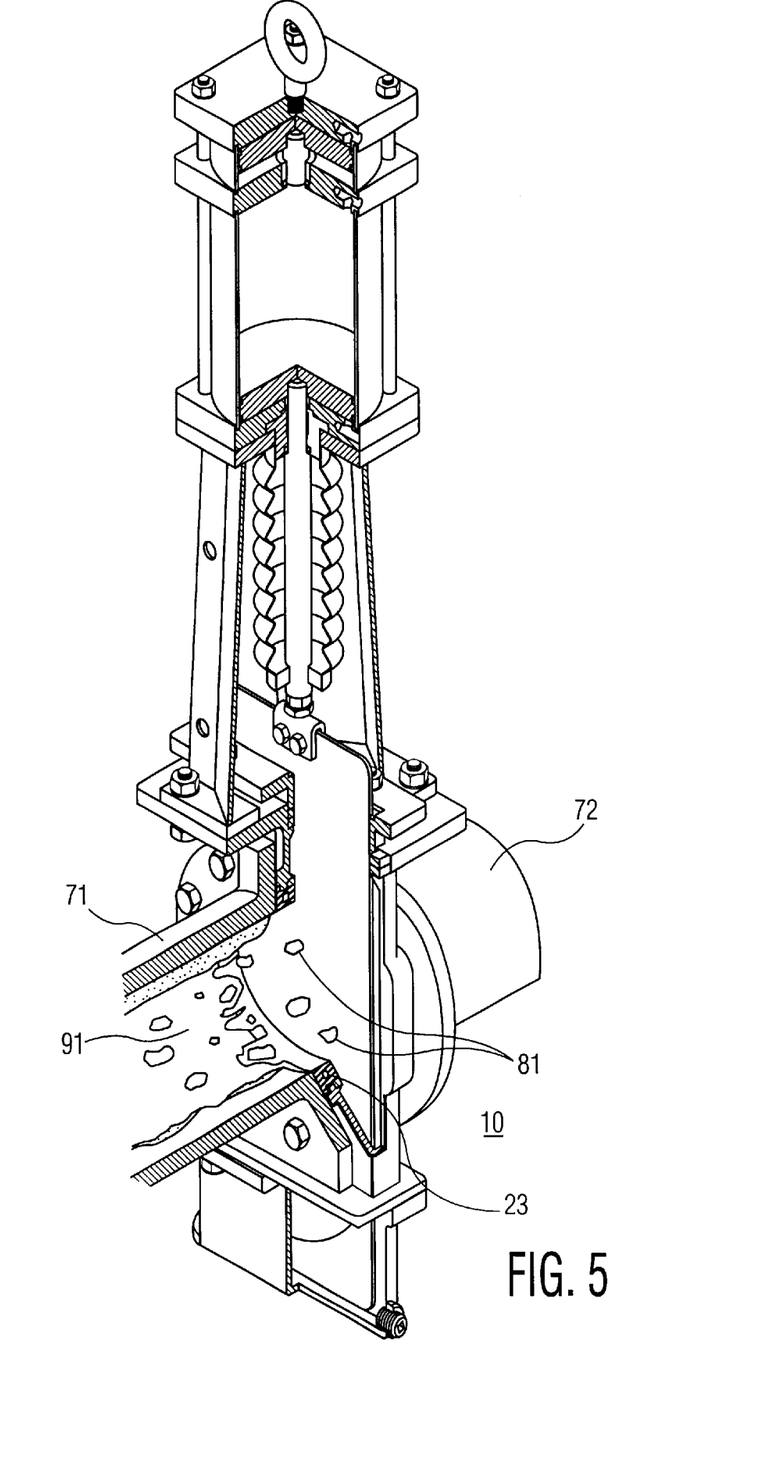
FIG. 5 shows the gate of the valve in a fully closed position after the operation depicted in FIG. 4 occurs.

FIG. 5 shows the ported slide gate valve 10 in the closed position again, as also illustrated in FIG. 2. However, FIG. 5 also shows the associated piping 71 and 72 and the broken scale fragments 81, now being suspended within a fluid 91. As stated above, the consequent reopening of the valve 10 will allow the fragments 81 to be transported downstream and away from the valve seats 23 and 24.

Essentially, scale build up was first observed as a serious problem during field operations of this type of valve. However, the scale build up typically did not cause damage to the seats in their top portions. It was discovered that this lack of damage was due to the fact that, when the gate moved downwards to reach a closed position, the bottom edge of the gate fractured any scale built up in the top portion of the valve interior. This fracturing occurred in such a manner that the scale fragments were pushed into the fluid flow and were carried away from the seats by the fluid flow.

However, it was also discovered that, during the same closing movement of the gate, the bottom edge of the gate sheared the scale build up in the bottom portion of the valve into the seats. Thus, the seats would experience tearing and destruction in their bottom portions.

The subject invention provides the advantageous feature of incorporating an intermediate gate position, as illustrated in FIGS. 3 and 4. This feature accomplishes an additional fracturing of the scale build up 82 in the bottom portion of the seats, in a manner similar to that conventionally achieved at the top portion. It is noted that, due to the circular shape of the valve bore, the bottom portion typically comprises the bottom half, whereas the top portion comprises the top half.

Thus, this solution accomplishes, in a highly simple and effective manner, the fracturing of the scale build up in both the top and bottom halves of the seats. It also avoids the long established problem of the scale being driven into the rubber or elastomeric seats during the valve closing process and destroying them.

Figure 6:
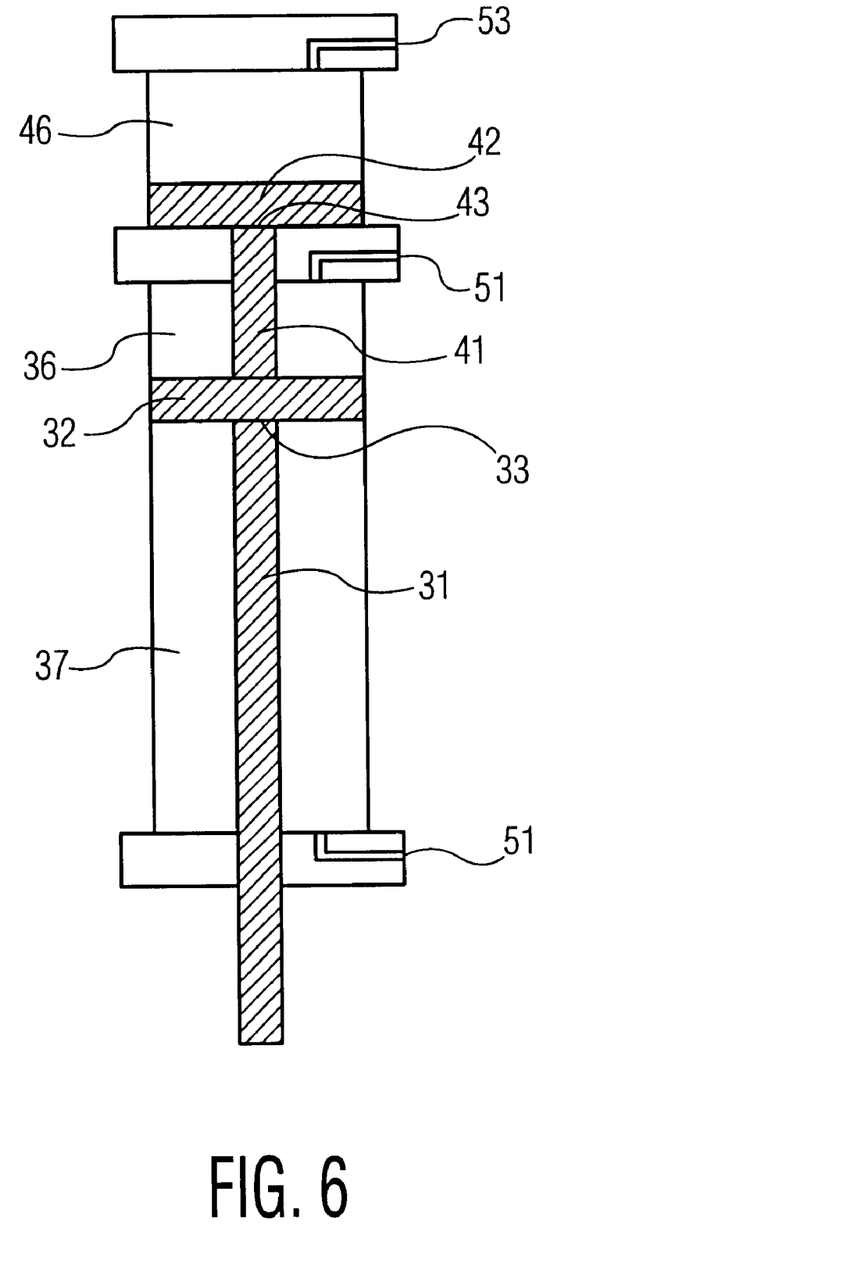
FIG. 6 shows a cross-sectional view of the cylinder operator of the invention, with the operator holding the valve in an open position.
Figure 7:
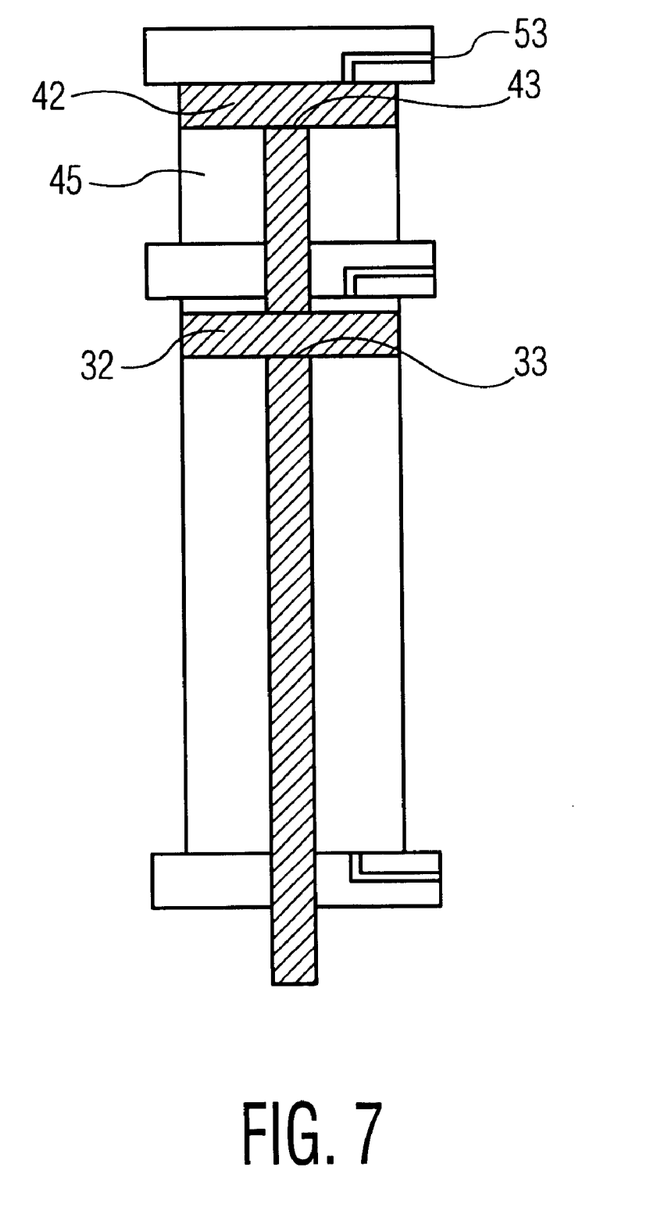
FIG. 7 shows a cross-sectional view of the cylinder operator, with the operator holding the valve in the intermediate position.
Figure 8:
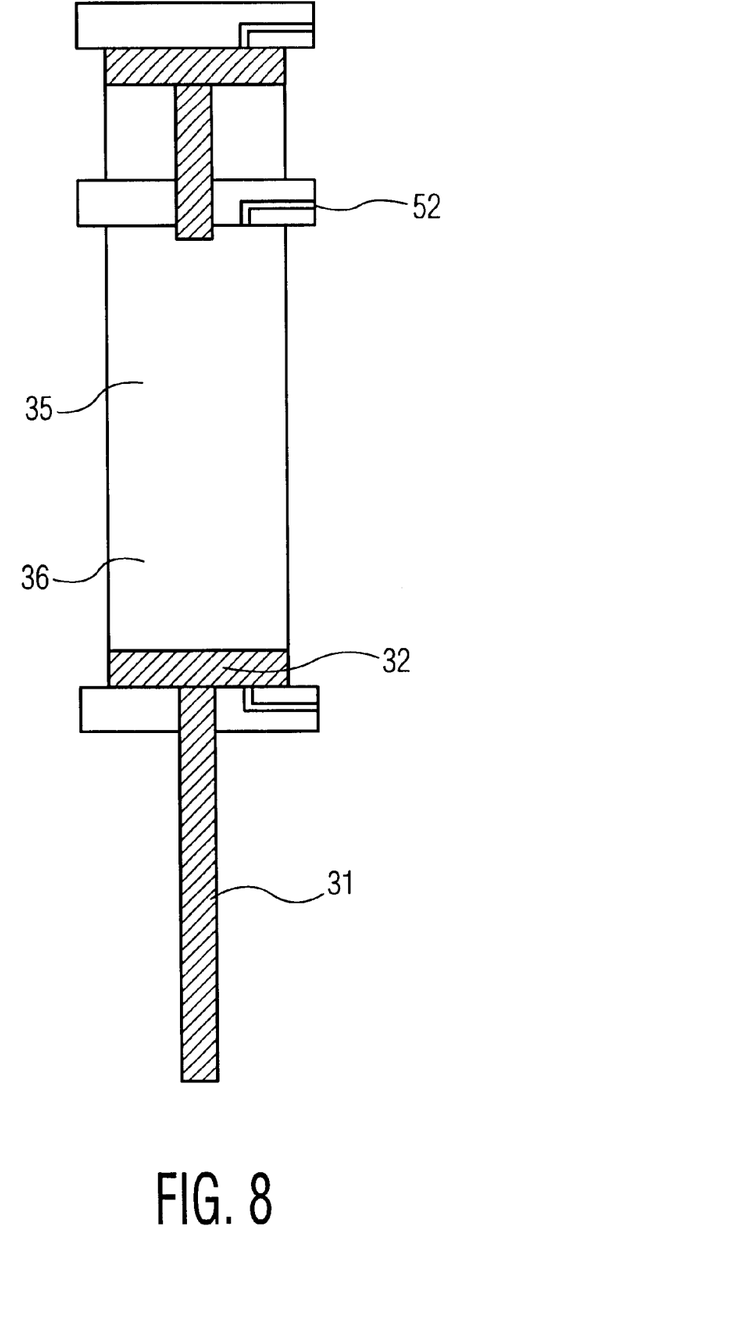
FIG. 8 shows a cross-sectional view of the cylinder operator, with the operator holding the valve in a closed position.

FIGS. 6, 7 and 8 further detail the sequencing of the simple cylinder operator of the present invention. FIG. 6 shows the positioning of the pistons 33 and 43 when the valve is in the open position. Both the space 46 above the secondary piston head 42 and the space 37 below the primary piston head 32 are charged at the same pressure, through the respective control ports 53 and 51. However, the presence of the primary piston rod 31 in the lower cylinder space 37 results in a force differential (the presence of the piston rod 31 reduces the piston's effective area, or the area on the bottom side of the piston head 32 that creates a force resulting from the applied pressure). Therefore, the pressure above the secondary piston head 42 exerts a slightly higher force, resulting in the downward force of the secondary piston rod 41 stopping the opposingly upward movement of the primary piston head 32. This halting of the piston movements holds the gate in the valve open position.

Referring to FIG. 7, the pistons are now shown in the intermediate position of the present invention. The pressure has now been vented from the space above the secondary piston head 42 through control port 53, allowing the secondary piston 43 to move upwards until its head 42 contacts the top of the cylinder 45. Since the space below the primary piston head 32 is still charged at a pressure, the primary piston 33 moves upwards, thereby lifting the gate to the aforementioned intermediate position, wherein the scale build up in the bottom portion is fractured. Thus, this cylinder operator provides a simple means of accomplishing the slight reverse-direction movement of the gate.

FIG. 8 now shows the pistons as they are positioned when the valve is closed. To move the gate to this position, the space 36 above the primary piston head 32 is charged through control port 52. This charging of pressure moves the primary piston head 32 down until it contacts the bottom of its cylinder 35. The gate, which is coupled to the primary piston rod 31 as described above, is thus driven down into the valve closed position.

To reopen the valve, the same pressure is again charged to the space 46 above the secondary piston head 42 and the space 37 below the primary piston head 32, as illustrated in FIG. 6. The primary piston 33 moves upward, raising the gate to a valve open position. As described above, the secondary piston 43 exerts a slightly higher force than the opposing force from the primary piston 33. Thus, the secondary piston 43 halts the upward movement of the primary piston 33 and holds the gate in the valve open position. The sequencing of this operator can by accomplished by conventional means as is well-known in the art, such as by the use of limit switches and solenoids.

The above described cylinder operator provides a highly simple and effective means of cycling among the three gate positions required by the subject invention. However, it is anticipated by the invention that the valve operation could be implemented in various ways, as in commonly known or to be known in the industry. The above-described hydraulic or pneumatic operators provide sufficient operating forces to break the hard scale build ups. Their air-tight constructions also provide durability and longevity in the highly polluted environments in which they typically must perform. However, other means of operation, such as electronic actuator or manual hand wheel means, may also fall within the scope of the present invention.

Although the foregoing description of the embodiments of the invention refers to the movements of the valve elements in terms of "upwards" and "downwards" and their positioning as "upper" and "lower" or "top" and "bottom", it is not intended that the invention be limited to such movements or positioning. Obviously, many modifications and variations are possible. For example, the gate may be operated in horizontal or other directions, as well. Additionally, the invention may also have utility for breaking other types of deposits, besides scale, that are left by fluid flowing through the valve. All such modifications and variations that may be apparent to a person skilled in the art are intended to be included within the spirit and scope of this invention as defined by the accompanying claims.

What is claimed is:

1. A method of operating a ported slide gate valve to fracture scale built up on a valve seat without damaging the seat comprising:
before moving a gate of the valve in a closing direction to reach a closed position where the passage of a fluid through the valve is blocked, first moving the gate in a direction counter to said closing direction to fracture scale built up on a portion of the seat, where the scale is fractured in a direction away from the seat and is carried away from the seat by the fluid.

2. A ported slide gate valve including a gate having an open position where a portion of the gate, having an aperture, is aligned between a plurality of ported elements to allow the passage of a fluid through the valve via the gate aperture and the ported elements, and a closed position where a solid portion of the gate is aligned between the ported elements to block the passage of the fluid, comprising:
means coupled to the gate to cause the gate, prior to moving in a closing direction toward the closed position, to first have a reverse movement in a direction counter to said closing direction, where the reverse movement causes a periphery of the gate aperture to break a scale build up in an interior of the valve in such a manner that the scale is broken in a direction away from a seat, located in the valve interior, and deposited in the fluid.

3. The ported slide gate valve of claim 2, where said means includes a primary piston and a secondary piston, where the primary piston is coupled to the gate in order to cause the movement of the gate.

4. The ported slide gate valve of claim 3, where the secondary piston holds the primary piston in the open position.

5. The ported slide gate valve of claim 3, where a movement of the secondary piston causes the reverse movement to break the scale.

6. The ported slide gate valve of claim 3, where an exertion of a same pressure to the two pistons in opposing directions causes the gate to move to the open position and holds the gate in the open position.

7. The ported slide gate valve of claim 3, where a relieving of a pressure from the secondary piston causes the reverse movement to break the scale.

8. A ported slide gate valve including a gate having an open position where a portion of the gate, having an aperture, is aligned between a plurality of ported elements to allow the passage of a fluid through the valve via the gate aperture and the ported elements, and a closed position where a solid portion of the gate is aligned between the ported elements to block the passage of the fluid, comprising:
at least one cylinder containing a primary piston and a secondary piston, where the primary piston is coupled to the gate to cause the movement of the gate;
means coupled to the cylinder to cause the gate, prior to its moving in a closing direction toward the closed position, to first have a reverse movement in a direction counter to said closing direction, where the reverse movement causes a periphery of the gate aperture to break a scale build up in an interior of the valve in such a manner that the scale is broken in a direction away from a seat, located in the valve interior, and deposited in the fluid.

9. A ported slide gate valve for use in slurry service comprising:
a gate having an open position where a portion of the gate, having an aperture, is aligned between a plurality of ported elements to allow the passage of a fluid through the valve via the gate aperture and the ported elements, and a closed position where a solid portion of the gate is aligned between the ported elements to block the passage of the fluid;
a seat located in a valve interior, where a scale builds up on the seat when the valve is operated in the open position; and
means coupled to the gate to cause the gate, prior to moving in a closing direction to the closed position, to first move in a direction counter to said closing direction to cause a periphery of the gate aperture to break the scale on a portion of the seat in a direction away from the seat and deposit the scale in the fluid, where said subsequent movement to the closed position also breaks the scale on another portion of the seat in a direction away from the seat.

* * * * *